UNITED STATES PATENT OFFICE.

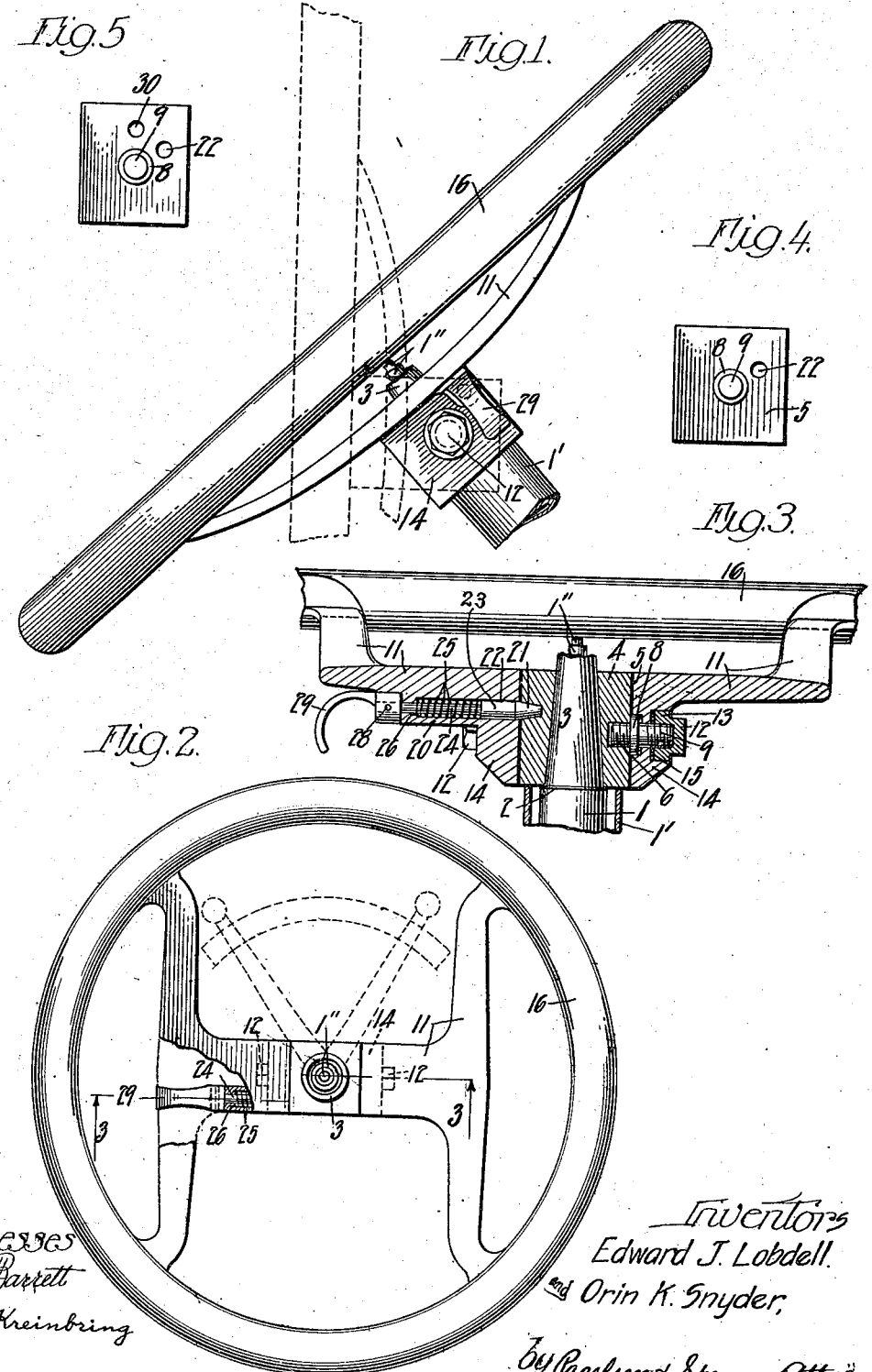

EDWARD J. LOBDELL AND ORIN K. SNYDER, OF ONAWAY, MICHIGAN; SAID SNYDER ASSIGNOR TO SAID LOBDELL.

TILTING STEERING-WHEEL.

1,147,030. Specification of Letters Patent. Patented July 20, 1915.

Application filed March 17, 1915. Serial No. 14,895.

*To all whom it may concern:*

Be it known that we, EDWARD J. LOBDELL and ORIN K. SNYDER, both citizens of the United States, and residents of Onaway, in the county of Presque Isle and State of Michigan, have invented a new and useful Tilting Steering-Wheel, of which the following is a specification.

This invention relates to tilting steering wheels for motor vehicles; and its object is to provide, in combination with the usual hollow steering post through which passes a controlling rod or rods for the vehicle, an improved head for the post and a wheel construction coöperating with the head and capable of tilting thereon without interfering with the controlling mechanism; also to provide very cheaply means for rigidly supporting and locking the wheel construction in steering position on the head; and an improved pivotal connection between the head and the wheel.

The invention consists in the details of construction shown, described and particularly pointed out in the claims.

In the drawings, Figure 1 is a side view of the wheel and upper end of the post, the upper ends of the control rods being broken away. Fig. 2 is a plan view corresponding to Fig. 1, parts being broken away and one portion of the controlling mechanism being indicated in dashed lines. Fig. 3 is a section on the line 3—3 of Fig. 2. Fig. 4 is a view of the head from the locking side. Fig. 5 is a similar view showing a modification.

Similar reference characters refer to like parts throughout the several views.

In the embodiment of our invention shown, 1 indicates the usual hollow steering rod that may be inclosed in a fixed post 1' and may in turn inclose the control rods 1'' in the ordinary manner. This rod may be shouldered at 2 and may have a tapering upper end 3 upon which is rigidly secured a pivot block 4, preferably rectangular, having at each side a flat bearing surface 5. Threaded or otherwise rigidly secured in the block at each side, preferably centrally of the corresponding surface 5, is a pivot pin 6 provided with an annular flange 8 and a threaded outer end 9.

Each of the pivots constitutes a support for a half spider section 11 that is slipped onto the corresponding pivot from the side and retained in position by a nut 12, the latter having a cylindrical base 13 received in and spaced slightly from the wall of a cylindrical depression formed in a downwardly extending flange 14 of the spider section. A washer 15 may be interposed between the nut and the flange. The inner face of the flange 14 is the same size and shape as the opposed surface 5, and is provided with a depression of depth slightly greater than the length of the flange 8 on the pivot. By adjusting the nuts 12 the pressure of the spider sections on the surfaces 5 may be regulated; and it will be seen that the flanges 8 afford bearings of considerable diameter about which the sections may turn. After the latter are assembled on the block, a rim 16 of any preferred construction is secured to their outer ends in a suitable manner.

It will be noticed that the spider sections are substantially T-shaped and that when assembled they together conform closely to the outline of the letter H. This arrangement is desirable in that it allows the wheel to tilt either forwardly or backwardly and affords a support for the rim in which the latter is unobstructed along the portions most often grasped by the hands.

In order to lock the wheel rigidly in steering position, one of the spiders is bossed at 20 and bored out to receive a locking bolt having a conical locking end 21 arranged to be thrust into a similar hole 22 formed in the corresponding face 5 at some distance from the axis of the pivots. The locking face merges into a cylindrical portion 23 that fits closely to the bore in the spider section and constitutes a guide for the whole bolt; and, at the rear of the portion 23, the bolt is reduced at 24 and extends outwardly through the boss. To normally thrust the bolt into locking engagement with the head, there is provided a spring 25 that surrounds the reduced portion 24 and bears against the guide portion 23 and a shoulder 26 formed in the spider. Attached to the outer end of the bolt by a pin 28 or otherwise, is a finger piece 29, by means of which the bolt may be withdrawn when it is desired to tilt the wheel.

In certain instances, particularly where very little clearance is allowed between the seat and the steering post, it is desirable to steer with the wheel tilted at an angle to the axis of the post, somewhat as indicated in dashed lines in Fig. 1, and, for the purpose of locking it securely in this position, the head is provided with a second hole 30 (Fig. 5), corresponding to the hole 22, in which the end of the locking bolt may be received.

It is clear that changes may be made in the details of the construction without departing from the spirit of the invention. We do not, therefore, wish to be limited otherwise than as indicated by the subjoined claims.

We claim:—

1. In combination, a hollow steering rod for a motor vehicle, a head through which said rod passes, said head being rigid with the rod and having a flat bearing surface at each side, alined pivots rigidly secured to the head, one of which projects horizontally from each of the bearing surfaces, the axes of said pivots being arranged in a plane containing the axis of the steering rod, a spider mounted to swing vertically on said pivots, a bolt carried by said spider, and slidable at an angle to said bearing surfaces, said head having a hole therein within the limits of the bearing surface adjacent the locking bolt into which the end of said bolt may project to lock the spider in steering position, and resilient means tending to project said bolt toward said bearing surface on the head, and a rim for the spider.

2. In combination, a hollow steering rod for a motor vehicle, a head through which said rod passes, said head being rigid with the rod and having a flat bearing surface at each side, alined pivots rigidly secured to the head, one of which projects horizontally from each of the bearing surfaces, a spider mounted to swing vertically on said pivots, a bolt carried by said spider and slidable at substantially right angles to said bearing surfaces, said head having a hole therein within the limits of the bearing surface adjacent the locking bolt into which the end of said bolt may project to lock the spider in steering position, resilient means tending to project said bolt toward said bearing surface on the head, and a rim for the spider.

3. In combination, a steering rod for a motor vehicle, a head through which said rod passes, said head being rigid with the rod and having a flat bearing surface at each side, alined pivots rigidly secured to the head, one of which projects horizontally from each of the bearing surfaces, the axes of said pivots being arranged in a plane containing the axis of the steering rod, a spider mounted to swing vertically on said pivots, a bolt carried by said spider and slidable at substantially right angles to said bearing surfaces, said bolt having a tapered end, said head having a hole therein within the limits of the bearing surface adjacent the locking bolt into which the tapered end of said bolt may be thrust to lock the spider in steering position, said tapering end serving to compensate for wear and to prevent any slight angular movement of the spider about the pivots that might otherwise occur, and resilient means tending to project said bolt toward said bearing surface on the head, and a rim for the spider.

4. In combination, a steering rod for a motor vehicle, a head through which said rod passes, said head being rigid with the rod and having a flat bearing surface at each side, alined pivots rigidly secured to the head, one of which projects horizontally from each of the bearing surfaces, the axes of said pivots being arranged in a plane containing the axis of the steering rod, a spider mounted to swing vertically on said pivots, said spider having a bore, a bolt slidable in said bore at substantially right angles to the bearing surfaces and having a guiding portion in close engagement with the wall of the bore, said bolt also having a tapered end, said head having a hole therein within the limits of the bearing surfaces adjacent the locking bolt into which the tapered end of said bolt may be thrust to lock the spider in steering position, said tapering end serving to compensate for wear and to prevent any slight angular movement of the spider about the pivots that might otherwise occur, resilient means tending to project said bolt toward said bearing surface on the head, and a rim for the spider.

5. In combination, a steering rod for a motor vehicle, a head through which said rod passes, said head being rigid with the rod and having a flat bearing surface at each side, alined pivots rigidly secured to the head, one of which projects horizontally from each of the bearing surfaces, the axes of said pivots being arranged in a plane containing the axis of the steering rod, a spider mounted to swing vertically on said pivots, a bolt carried by said spider, and slidable at an angle to said bearing surfaces, said head having two spaced holes therein within the limits of the bearing surface adjacent the locking bolt, into either of which the end of said bolt may project, the bolt, when received in one of the holes, serving to lock the wheel in a plane at substantially right angles to the axis of the post, and, when received in the other, serving to lock the wheel in a steering position in a plane at an acute angle to the axis of said post, resilient means for projecting the bolt toward the bearing surface on the head, and a rim for the spider.

6. In combination, a hollow steering rod for a motor vehicle, a head through which said rod passes, said head being rigid with the rod and having a flat bearing surface at each side, alined pivots rigidly secured to the head, one of which projects horizontally from each of the flat bearing surfaces, each of the pivots including an annular flange adjacent the corresponding flat bearing surface and having a threaded outer end, a spider section mounted on each of the pivots, said spiders having cylindrical depressions therein in which the annular flanges are received whereby bearings of increased diameter are formed between the sections and the pivots, nuts threaded on the outer ends of the pivots for independently clamping the sections of the spider against the corresponding flat bearing surfaces, and means for locking the spider in predetermined pivotal relation to the head of the post.

7. In combination, a hollow steering rod for a motor vehicle, a head through which said rod passes, said head being rigid with the rod and having a flat bearing surface at each side, alined pivots rigidly secured to the head, one of which projects horizontally from each of the flat bearing surfaces, spider sections, one mounted on each of the pivots, said pivots passing through said spider sections and being threaded on their outer ends, nuts on the threaded ends of the pivots for independently clamping the sections of the spider against the corresponding flat bearing surfaces on the head, and means for locking the spider in predetermined pivotal relation to the head of the post.

8. In combination, a hollow steering rod for a motor vehicle, a head through which said rod passes, said head being rigid with the rod and having a flat bearing surface at each side, alined pivots rigidly secured to the head, one of which projects horizontally from each of the flat bearing surfaces, spider sections, one mounted on each of the pivots, said pivots passing through said spider sections and being threaded on their outer ends, nuts on the threaded ends of the pivots for independently clamping the sections of the spider against the corresponding flat bearing surfaces on the head, said nuts having cylindrical bases received in corresponding depressions formed in the walls of the spider sections, washers interposed between the nuts and the corresponding sections, and means for locking the spider in predetermined pivotal relation to the head of the post.

9. In combination, a steering rod for a motor vehicle, a head through which said rod passes, said head being rigid with the rod and having a flat bearing surface at each side, alined pivots rigidly secured to the head, one of which projects horizontally from each of the flat bearing surfaces, spider sections, one mounted on each of the pivots, said pivots passing through said spider sections and being threaded on their outer ends, nuts on the threaded ends of the pivots for independently clamping the sections of the spider against the corresponding flat bearing surfaces on the head, and means for locking the spider in predetermined pivotal relation to the head of the post.

10. In combination, a steering rod for a motor vehicle, a head through which said rod passes, said head being rigid with the rod and having a flat bearing surface at each side, alined pivots rigidly secured to the head, one of which projects horizontally from each of the flat bearing surfaces, each of the pivots including an annular flange adjacent the corresponding flat bearing surface and having a threaded outer end, a spider section mounted on each of the pivots, said spiders having cylindrical depressions therein in which the annular flanges are received whereby bearings of increased diameter are formed between the sections and the pivots, nuts threaded on the outer ends of the pivots for independently clamping the sections of the spider against the corresponding flat bearing surfaces, and means for locking the spider in predetermined pivotal relation to the head of the post.

In testimony whereof we each sign this specification in the presence of two subscribing witnesses.

EDWARD J. LOBDELL.
ORIN K. SNYDER.

Witnesses to signature of Edward J. Lobdell:
HUGO W. KREINBRING,
L. M. SPENCER.

Witnesses to signature of Orin K. Snyder:
R. D. SHAW,
IRA SCHEIFLEY.

Copies of this patent may be obtained for five cents each, by addressing the "Commissioner of Patents, Washington, D. C."